United States Patent
Yang et al.

(10) Patent No.: US 7,609,701 B2
(45) Date of Patent: Oct. 27, 2009

(54) COMMUNICATION USING PRIVATE IP ADDRESSES OF LOCAL NETWORKS

(76) Inventors: Zheng Yang, 610 San Conradi Ter., #7, Sunnyvale, CA (US) 94085; Zhe Wang, 11 Lawrence Dr., #501, Princeton, NJ (US) 08540; Jie Sun, 39600 Fremont Blvd., Apartment 117-18, Fremont, CA (US) 94538

( * ) Notice: Subject to any disclaimer, the term of this patent is extended or adjusted under 35 U.S.C. 154(b) by 475 days.

(21) Appl. No.: 11/359,340

(22) Filed: Feb. 22, 2006

(65) Prior Publication Data

US 2007/0195800 A1    Aug. 23, 2007

(51) Int. Cl.
H04L 12/56 (2006.01)
H04L 12/28 (2006.01)
G06F 15/16 (2006.01)

(52) U.S. Cl. ............... 370/395.52; 370/401; 370/409; 709/249

(58) Field of Classification Search ............... 370/401, 370/359, 395.52, 409; 709/249
See application file for complete search history.

(56) References Cited

U.S. PATENT DOCUMENTS

2004/0139227 A1    7/2004    Takeda
2004/0148439 A1    7/2004    Harvey
2004/0168049 A1*   8/2004    Lee ........................... 713/150
2004/0218611 A1*   11/2004   Kim .......................... 370/401
2005/0117588 A1*   6/2005    Tseng et al. ............ 370/395.31
2005/0175031 A1*   8/2005    Harley ....................... 370/466

FOREIGN PATENT DOCUMENTS

EP    1343298    10/2003
EP    1441483     7/2004

OTHER PUBLICATIONS

David R. Cheriton & Mark Gritter, Triad: a New-Generation Internet Architecture, 20 pages, Computer Science Department Stanford University, Stanford, CA.
International Search Report and Written Opinion for PCT/US2007/004690, Aug. 13, 2007, European Patent Office as ISA, 13 Pages.

* cited by examiner

*Primary Examiner*—Alpus H Hsu
*Assistant Examiner*—Saad Hassan
(74) *Attorney, Agent, or Firm*—North Weber & Baugh LLP

(57) ABSTRACT

A system, apparatus and method to use private IP addresses to designate host devices or nodes in different networks for communication purposes are described. Various embodiments of the invention address the problem of a shortage of public IP addresses under IPv4 architecture. In one embodiment of the invention, dynamic NAT penetration capabilities are provided which consequently expand the capability of running peer-to-peer applications on the Internet.

32 Claims, 11 Drawing Sheets

_US 7,609,701 B2_

COMMUNICATION USING PRIVATE IP ADDRESSES OF LOCAL NETWORKS

BACKGROUND

A. Technical Field

This application relates to a system and method of using local network addresses for communicating between devices located at different networks.

B. Background of the Invention

In today's communication world, engineers have constantly encountered two problems: the first is the shortage of internet protocol ("IP") addresses to designate all the network users and the second is associated with the widespread usage of network address translation ("NAT") as well as firewalls at local area network ("LAN") levels. The two problems cause substantial difficulties or increase costs for many applications which essentially require direct or peer-to-peer communications between users. For example, programmers have to devise specific tunneling methods to penetrate different types of NATs for IP applications. Such difficulties are expected to become significantly worsened after an increasing number of mobile users are connected on wireless networks and using of peer-to-peer IP applications such as online games, IP phones, file sharing programs, online collaboration applications, IPTV, instant messenger and other types of interactive applications.

Although IPv6 has been proposed and designed to alleviate the shortage of unique network addresses, the current infrastructure based on IPv4 is expected to coexist for a while. To exploit the capabilities of the current infrastructure and meet the growing demands, there is a need to provide a system and method to enable direct and peer-to-peer IP communication between devices or nodes which are operative behind network address port translation ("NAPT") or basic NAT devices.

SUMMARY OF THE INVENTION

The present invention provides a system, apparatus and method to use private IP addresses to designate host devices or nodes in different networks for communication purposes. Various embodiments of the invention address the problem of a shortage of public IP addresses under IPv4 architecture. In one embodiment of the invention, dynamic NAT penetration capabilities are provided which consequently expand the capability of running peer-to-peer applications on the Internet.

Other objects, features and advantages of the invention will be apparent from the drawings, and from the detailed description that follows below.

BRIEF DESCRIPTION OF THE DRAWINGS

Reference will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

DETAILED DESCRIPTION OF THE PREFERRED EMBODIMENTS

The following description is set forth for purpose of explanation in order to provide an understanding of the invention. However, it is apparent that one skilled in the art will recognize that embodiments of the present invention, some of which are described below, may be incorporated into a number of different computing systems and devices. The embodiments of the present invention may be present in hardware, software or firmware. Structures and devices shown below in block diagram are illustrative of exemplary embodiments of the invention and are meant to avoid obscuring the invention. Furthermore, connections between components within the figures are not intended to be limited to direct connections. Rather, data between these components may be modified, re-formatted or otherwise changed by intermediary components.

Reference in the specification to "one embodiment", "in one embodiment" or "an embodiment" etc. means that a particular feature, structure, characteristic, or function described in connection with the embodiment is included in at least one embodiment of the invention. The appearances of the phrase "in one embodiment" in various places in the specification are not necessarily all referring to the same embodiment.

Figure 1:
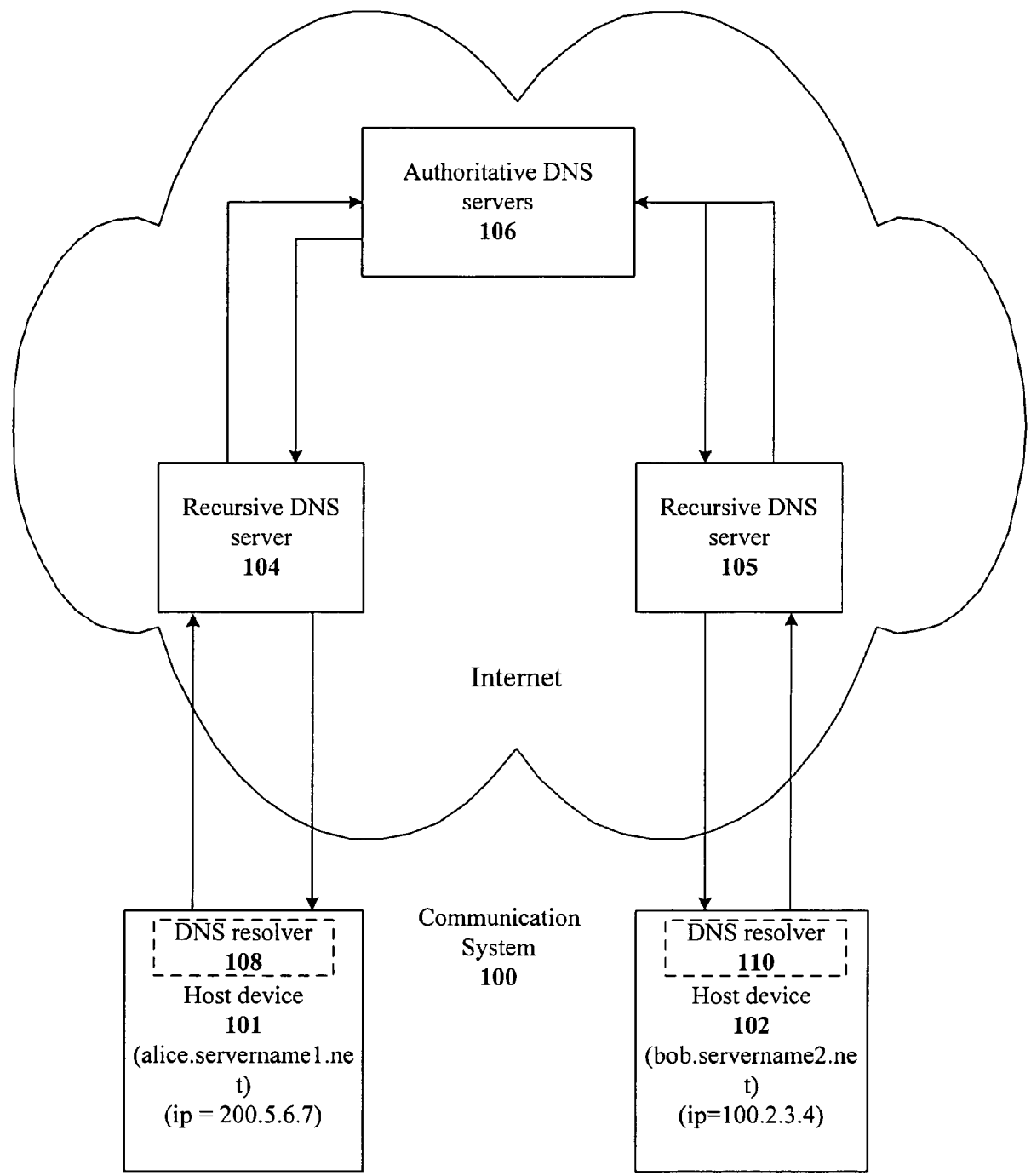
FIG. 1 illustrates a communications system based on traditional DNS addressing.

FIG. 1 illustrates a communications system 100 using the traditional DNS system. In order for a host device 101 having an alphabetic domain name alice.servername1.net to communicate with another host device 102 having an alphabetic domain name bob.servername2.net, host devices rely on the DNS service system to translate the alphabetic domain names into actual IP addresses. As illustrated, the DNS system can include a root DNS server—authoritative DNS server 106, and recursive DNS servers 104 and 106 as well as the DNS resolvers 108 and 110 that are respectively located in host devices 101 and 102. Through the DNS system, host device 101 is able to look up the IP address of host device 102, which, as an example, is translated to 100.2.3.4. Host device 102 is able to look up the IP address of host device 101, which as an example, is translated to 200.5.6.7.

Figure 2:
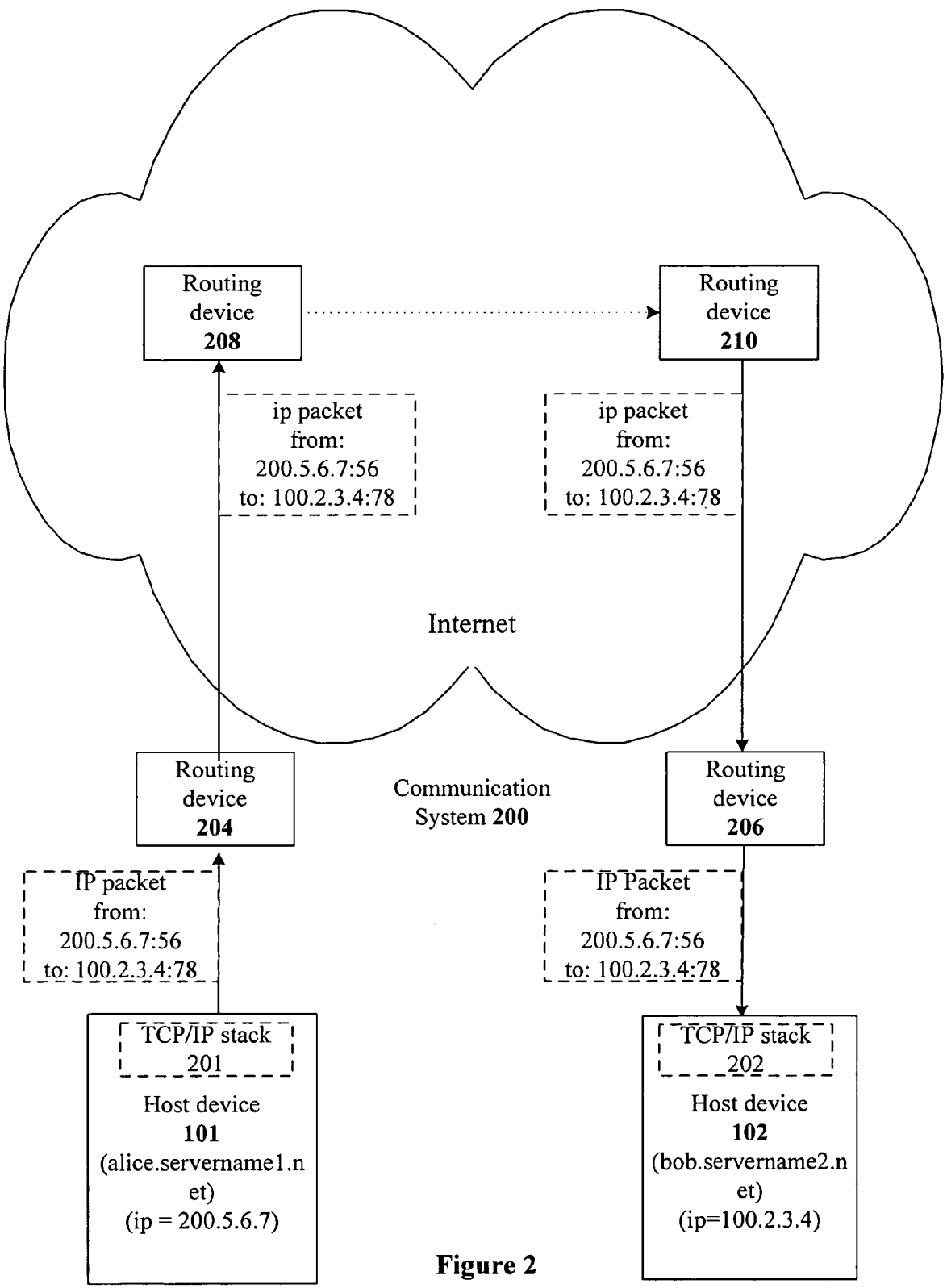
FIG. 2 illustrates a communication system including routers.

FIG. 2 illustrates the data flow based on IP protocol in the communications system 100. In order for host device 101, acting as the source device, to transmit data to reach the destination—host device 102, typically, there are several routing devices, e.g., 204, 206, 208, 210 etc, that perform routing services. By way of example, host device 101 can send an Internet Protocol (IP) packet out through its TCP/IP stack 201. The packet is indicated by specifying the source and destination addresses and the port 200.5.6.7:56 and the destination address and the port 100.2.3.4:78. The routing devices recognize the IP packet and accomplish the data forwarding in normal course to host device 101 via its TCP/IP stack 202.

Figure 3:
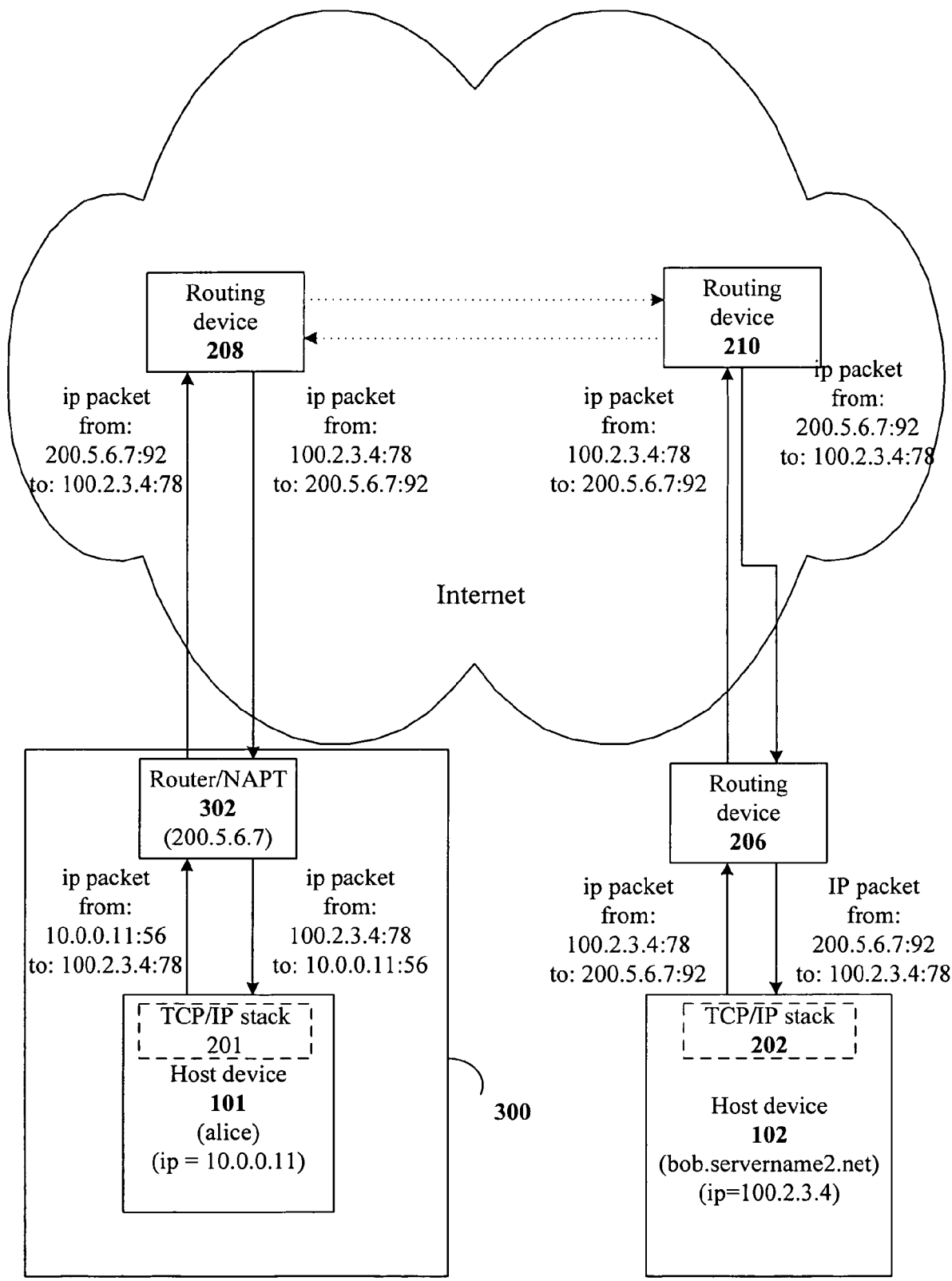
FIG. 3 illustrates a communications system including NAPT.

FIG. 3 illustrates the data flow when host device 101 is placed behind a NAPT-enabled routing device 302. Host device 101 and host device 102 do not have a true "end-to-end" connectivity. Host device 101 is assigned a private IP address subnets 10.0.0.11 by the local area network 300. The host device 101 itself does not have a public IP address. The routing device 302, which is connected to the same network 300, is also connected to the Internet with a public address 200.5.6.7. When host device 101 communicates with host device 102, in a typical configuration of NAPT, as the IP packet passes from the routing device 302, the source address on the packets is translated from the private address of the source to the public address as well as the port numbers are mapped. For example, as illustrated, the routing device 302 receives from the TCP/IP stack 201 an IP packet designated as source address/port 10.0.0.11:56 and destination address/port 100.2.3.4:78. After conducting NAPT, the routing device 302 convert the packet as one designated by source/port 200.5.6.7:92 to destination/port 100.2.3.4:78.

The other routing devices 208, 210 and 206 then forward the IP packet according to the specified destination according to the routing protocols.

The routing device 302 tracks the data about each active connection (particularly the destination address and port) at an outbound phase. When a reply returns to the routing device 302 by host device 102, e.g., source 100.2.3.4:78 to the destination/port 200.5.6.7:92, it uses the connection tracking data it stored during the outbound phase to determine where on the local network 300 to forward the reply. In this case, the routing device 302 identifies the reply as intended for host device 101 and then forwards it to host device 101.

Although the use of NAT techniques is popular and helps deal with the IP address shortage problems, it sometimes causes significant problems for hosts to communicate. Hosts behind NAT-enabled devices (e.g., routers) often cannot participate in some Internet protocols. Some Internet services, which require the initiation of TCP connections from the outside network, or stateless protocols such as those using UDP, can be disrupted, especially when both sides are behind NAT-enabled devices.

Figure 4:
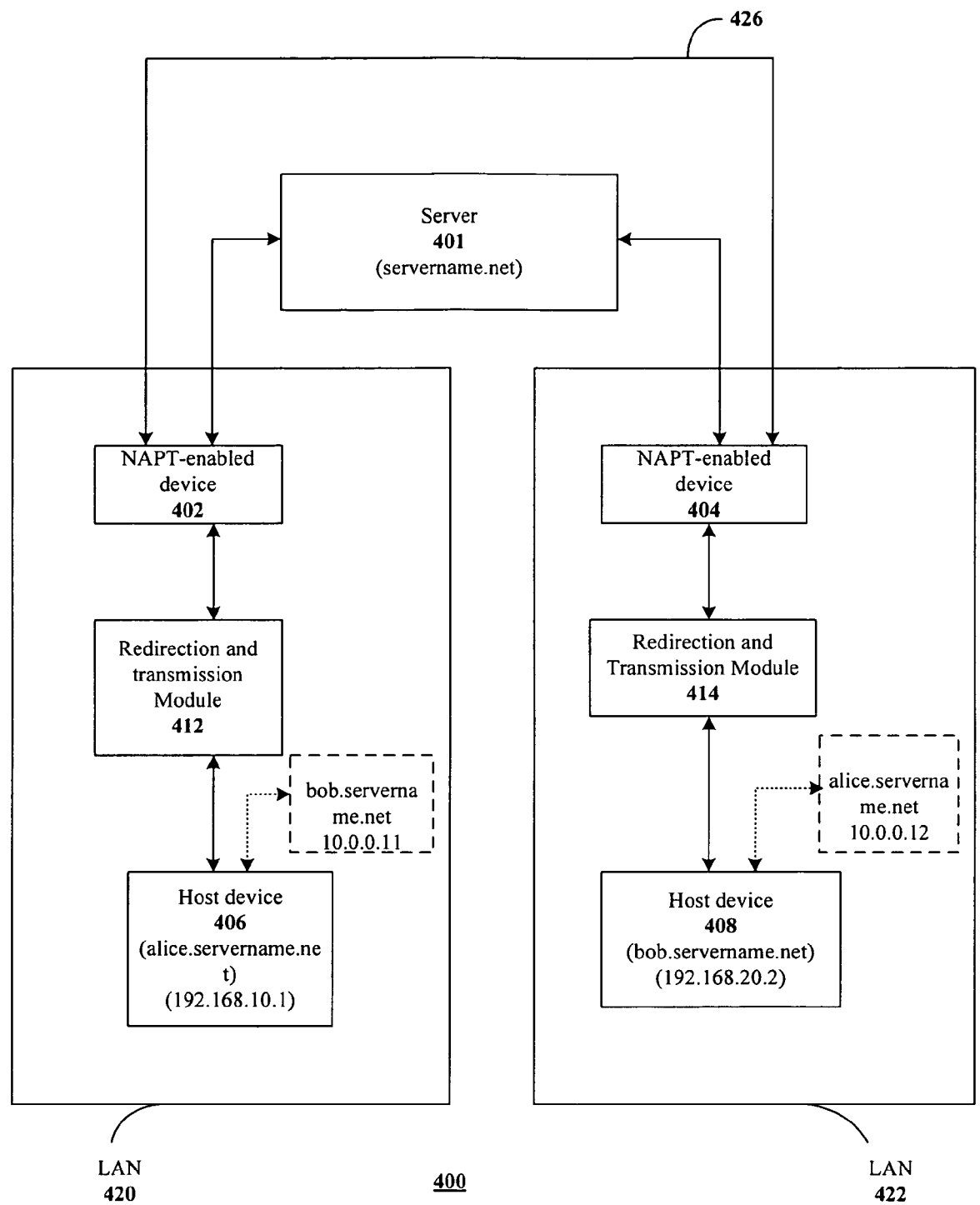
FIG. 4 illustrates a communications system according to one embodiment of the invention.

FIG. 4 illustrates an example of a communications system according to one embodiment of the invention. The communication system can be either a wired computing network or any wireless network such as WiFi or GSM/UMTS that support IP communication. Host device 406 and host device 408 are capable of communicating with each other based on IP connections. Host devices 406 and 408 can be a computer or a mobile phone device running IP applications.

Host device 406 is configured to connect with a NAPT-enabled device 402. Host device 406 and NAPT-enabled device 402 belong to a network 420. Host device 408 is configured to connect with a NAPT-enabled device 404. Host device 408 and NAPT-enabled device 404 belong to a network 422. Host devices 406 and 408 do not have their own public IP addresses as a result of using NAT techniques at the local networks 420 and 422. Host device 406 and host device 408 are assigned with internal IP network addresses (private IP addresses) respectively. For example, a network administrator managing network 420 which assigns 192.168.10.1 as a private IP address for host device 406. Similarly, a network administrator managing network 422 assigns 192.168.20.2 as the private IP address for host device 408.

Communications between host devices 406 and 408 rely on NAPT-enabled devices 402 and 404 as described in FIG. 3. Typically, the communications are carried out through an IP connection 426.

According to an embodiment of the invention, network 422 and network 420 are both connected to server 401. Server 401 assigns individual alphabetic domain names according to its own rules to host devices that are located in network 422 and network 420. For example, server 401 assigns a domain name in a form of servername.domain1 to host device 406, e.g., alice.servername.net and assigns another domain name in a form of servername.domain2 to host device 408, e.g., bob.servername.net. The assigned domain names are unique worldwide and independent.

Server 401 has its own domain name, e.g., servername.net. In one embodiment, server 401 can be understood as a composition of a private DNS system. The private DNS system formed by server 401 is capable of assigning a world-unique alphabetic domain names to any party that request for such domain names. For example, the assigning process of the domain name can be initiated by requests sent by host devices 406 and 408 individually. Upon receiving the request, server 401 assigns a domain name in a particular format, such as membername.servername.net. In this particular exemplary format, the membername is chosen by the requesting devices and is eventually approved by server 401 to ensure the uniqueness of the membername. After the domain name is assigned to a host device, host device is registered with server 401 or the associated private DNS system.

Server 401 maintains the current information of how the registered host device can be reached. For example, server 401 may keep an active TCP/IP connection with host device 406 alice.servername.net. In the event of host device 406 changes its location, e.g, by moving to a different network, the host device will update the location information with server 401.

It is understood that server 401 can be physically implemented on suitable hardware and does not necessarily take the form of a computer server. Server 401 may be physically located in network 420 and network 422.

In network 420, a private IP address is dynamically assigned to host device 408 when host device 406 wants to contact with host device 408 initially, although host device 408 does not belong to or is not otherwise administered by network 420. As illustrated in FIG. 4, network 420 dynamically assigns a private IP address 10.0.0.11 to host device 408 which has a domain name bob.servername.net. One of the purposes of assigning the private IP address of network 420 to host device 408 is to create an alternative to using a dedicated public IP address when communicating to host device 408. As further described below, host device 406 uses the private IP address 10.0.0.11 to designate host device 408 and communicate with host device 408 when initiating a session to transmit IP packet. Host device 406 may not even know that host device 408 is not a device resided in network 420, but host device 406 communicates with host device 408 as if it is a device belonging to the same network.

It is important to note that in certain circumstances a range of public IP addresses are acquired for commercial or technical reasons for assigning to host devices outside a network. The "privatization" of these public IP addresses can be efficient for communicating between devices. Once these public IP addresses are acquired, they are no longer used by the public Internet.

When an application run by host device 406 initiates a request to communicate with host device 408, the redirection module and transmission module 412 receives the request and data packet and automatically selects among a variety of NAT penetration or NAT tunneling techniques for implementation. As a result, the request and the IP packet penetrate through NAPT-enabled device 402 and 404 with the cooperation of redirection and transmission module 414 in network 422. The combination of the use of private IP addresses and the NAT penetration/tunneling techniques overcomes potential complication of using NAT or NAPTs and greatly improves the "end-to-end" connectivity. This creates a very beneficial technical infrastructure for many peer-to-peer applications to communicate directly without being severely hampered by NAT/NAPT.

By way of example, to understand the techniques of deploying the NAT/NAPT penetration or tunneling techniques, the commonly used NAT penetration or tunneling techniques can include ICE, STUN protocol and other hole-punching techniques. In particular, the technique of STUN protocol ("Simple Traversal of UDP over NATs") is implemented to traverse the NAT or NAPT for UDP-based applications. (see the white paper, entitled "NAT Traversal for Multimedia over IP Services", by Newport Networks Limited, http://www.newport-networks.com/whitepapers/nat-traversal1.html).

For host devices running some of the VoIP applications to successfully penetrate the variety of firewalls or NATs, the technique of ICE ("Interactive Connectivity Establishment") can be implemented. (see the white paper, entitled "Interactive Connectivity Establishment (ICE): A Methodology for Network Address Translator (NAT) Traversal for Offer/Answer Protocols", authored by J. Rosenberg of Cisco Systems, http://www.ietf.org/internet-drafts/draft-ietf-mmusic-ice-06.txt)

For a more general discussions of various NAT penetration or NAT transversal techniques that are used to implement the embodiments of the present invention, the white paper entitled "Peer-to-Peer Communication Across Network Address Translators" (authored by Bryan Ford Massachusetts Institute of Technology, Pyda Srisuresh of Caymas Systems, Inc. and Dan Kegel of kegel.com, http://www.brynosaurus.com/pub/net/p2pnat/) can be one of the references and it is incorporated by reference in this application.

It is also understood that and NAT penetration or tunneling services include those protocols used in both wired networks and wireless network. For example, in GSM or UMTS networks, GPRS Tunneling Protocol is used to establish tunnels for different end users to continue staying on the Internet while moving from different locations. Whether the present invention is used in a wired network or a wireless network, suitable NAT penetration or tunneling services or techniques are selected to adapt themselves to the network environment. As a result, a computing device or a mobile device use the recipient's domain name, which is then dynamically associated with a private IP addresses of its own local network as destination addresses of recipients and communicate smoothly in spite of presence of NAT or NAPT routers.

When the request and IP packet is received and penetrates NAPT-enabled device 404 through communication channel 426, the request and associated IP packet pass through the redirection and transmission module 414 and eventually reaches host device 408 according to the local network configuration.

As described in the embodiments in the present application, redirection and transmission module 412 described in FIG. 4 can also be located in NAPT-enabled device 402 (e.g., router) combined with a firewall firmware or located in host device 406. It can also be located in another networked device in the same network 420. The exact location of redirection and transmission module 412 depends on the configuration of hardware and the communications system. Similarly, redirection and transmission module 414 can either be located in NAPT-enabled device 404, host device 408 or another networked device located in network 422.

Likewise, devices located in network 422 implement the above mentioned methods and adopt the same hardware structure to communicate with devices located in network 420. For example, in network 422, host device 408 has a private IP address of 192.168.20.2. It is also assigned a bob.servername.net domain name by server 401. After host device 408 registers with server 401, host device 408 is capable of learning the existence of host device 406 through its domain name alice.servername.net. Network 422 then assigns a private IP address, e.g., 10.0.0.12 to host device 406 (alice.servername.net). When applications run on host device 408 initiate requests to communicate with host device 406, host device 408 contacts with host device 406 through 10.0.0.12. As will be further explained below, such requests and associated data packets are processed by redirection and transmission module 414 and passed through the NAPT-enabled device 404 by implementing tunneling techniques. The requests and packets are in turn transferred to network 420 and eventually arrive at the intended host device 406.

Although not illustrated in FIG. 4, network 420 and network 422 can include a number of host devices. Each of host devices is assigned by server 401 a unique alphabetic domain name in the form of membername.servername.domain. For each of the host devices in network 422 with which devices in network 420 want to communicate, the network 420 assigns a private IP address to associate with each of the alphabetic domain names of individual host devices in network 422. Similarly, for each of host devices in network 420 with which certain devices in network 422 want to communicate, network 422 assigns a private IP address to associate with each of the alphabetic domain names of the individual host devices in network 420. Hence, the total number of dynamically allocated private IP addresses needed within network 420 is limited to the number of hosts it wants to communicate with concurrently.

It is understood that network 420 and network 422 can be in form of a LAN or WAN and numerous LANs or WAN can be connected through the Internet to server 401. Individual host devices or communication devices or nodes which communicate based on Internet Protocols are assigned with worldwide unique domain names by server 401. Within the same local network, private IP addresses are used to associate with the domain names to identify the devices located in other networks. In so doing, when any devices in two different networks are in communications, they treat the other side as if they are communicating with another device located in the same network. In other words, any of these devices in different network now recognize the other side by globally-unique domain names with local addresses. With the automatic NAPT tunneling and penetration techniques implemented at each network level, any of these devices communicate without substantial overhead, enhancing the end-to-end connectivity of the IP applications involving peer-to-peer communications. The system and method described herein and the embodiments below therefore provide a platform for saving programmers of IP applications, such as peer-to-peer applications, from spending extra efforts on penetrating NAPT on the network.

It should be noted that the benefits of the present invention partly result from the use of server 401. According to one embodiment of the present invention, server 401 performs a function to establish tunneling service or otherwise facilitate the NAPT penetration processes, depending on the actual types of NAPT penetration or transversal techniques. As an example, host devices 406 and 408 maintain a constant connection with server 401. Host devices contact server 401 having a public address and then implement UDP hole punch techniques to bypass firewalls and NAPT-enabled devices 404 and 402. In alternative embodiments according to this invention, server 401 is implemented into separate modules. One of the modules performs the function of assigning unique domain names for communication devices. Another module maintains regular contact with network 420 and network 422 and participates in the tunneling service for penetrating NAPT devices at either network.

Another benefit of using server 401 is to enhance the security level as required by the today's communications world. Especially for peer-to-peer communications, any of peer devices may send data from any locations, traditional ways of IP based authentication method are no longer applicable. Hence, server 401 can be implemented to create special authentication systems for peer devices. In one embodiment of the present invention, separate authentication modules are included in host device 406 and 408 as well as in server 401. The exact method used for authentication at these authentication modules can vary.

By way of example, key cryptography based authentication is implemented in hardware or firmware. At the time of registering with server 401, host device 406 registers its identity, creates a pair of public/private key for its own use and receives a digital certificate (including host device 406's identity, its public key, etc) signed by server 401 with server's private key. Host device 406 also receives server's 401 public key for future use. Later when communicating with host device 408, host device 406 uses this digital certificate along with a message signed by its private key to prove its identity to host device 408. Host device 408 is configured to trust a digital certificate endorsed or signed by server 401. By verifying host device's 406 public key, host device 408 then knows the message signed by the private key of host device 406 is indeed sent from host 406. In this embodiment, the authentication s method only requires the participation of the authentication module of server 401 at the moment of registration of host devices. It provides desirable scalability for a large system. Furthermore, the authentication modules at host devices and server 401 are implemented in various methods. Hence, a system designer is allowed to provide authentication functionality at application layers without a need for making authentication modules for the base system design.

Figure 5:
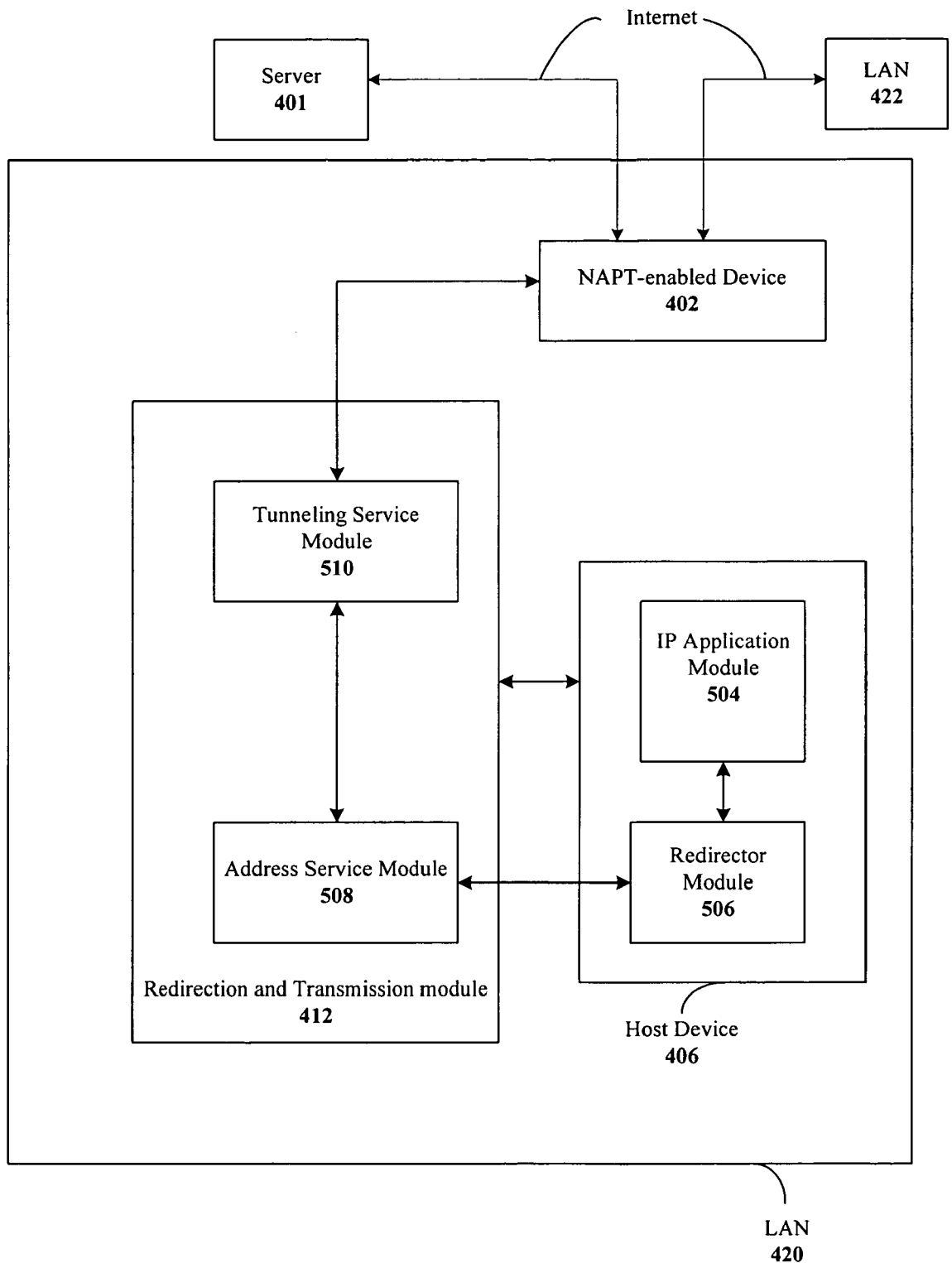
FIG. 5 illustrates a host device of the communications system according to one embodiment of the invention.

FIG. 5 further illustrates an embodiment of the invention. In network 420, the redirection and transmission module 412 comprises a Tunneling Service Module 510, an Address Service Module 508. Host device 406 includes an IP Application Module 504 and a Redirector Module 506. By way of example, when in operation, host device 406 runs on Microsoft Windows operating system. When an IP Application Module 504 sends a request to communicate with bob.servername.net or another device registered with server 401, such a request is intercepted by Redirector Module 506. In one embodiment, Redirector Module 506 is placed in the TCP/IP stack located at the kernel of the operating system. Note that if the request is made the first time between the devices, this first request is in the form of DNS query retrieving the IP address of the device bob.servername.net. Address Service Module 508 then dynamically assigns a private IP address to bob.servername.net. After the private IP address is assigned, when the IP Application Module 504 sends any IP packet with a destination address of this particular private IP address, Redirector Module 506 recognizes that the data packet is intended to send to bob.servername.net.

More particularly, when Redirector Module 506 subsequently forwards data packet to Address Service Module 508 with the private IP address, Address Service Module 508 determines if the associated private IP address corresponds to an outside device corresponding to a membername.servername.net domain name. Once the determination is made at Address Service Module 508 and additional information related to the associated private IP address is retrieved, the IP packet is further transferred to Tunneling Service Module 510. Tunneling Service Module 510 implements network penetration techniques or relay techniques so that the communication requests and IP packet can penetrate through the NAPT-enabled device 402 and reach device 408.

Figure 6:
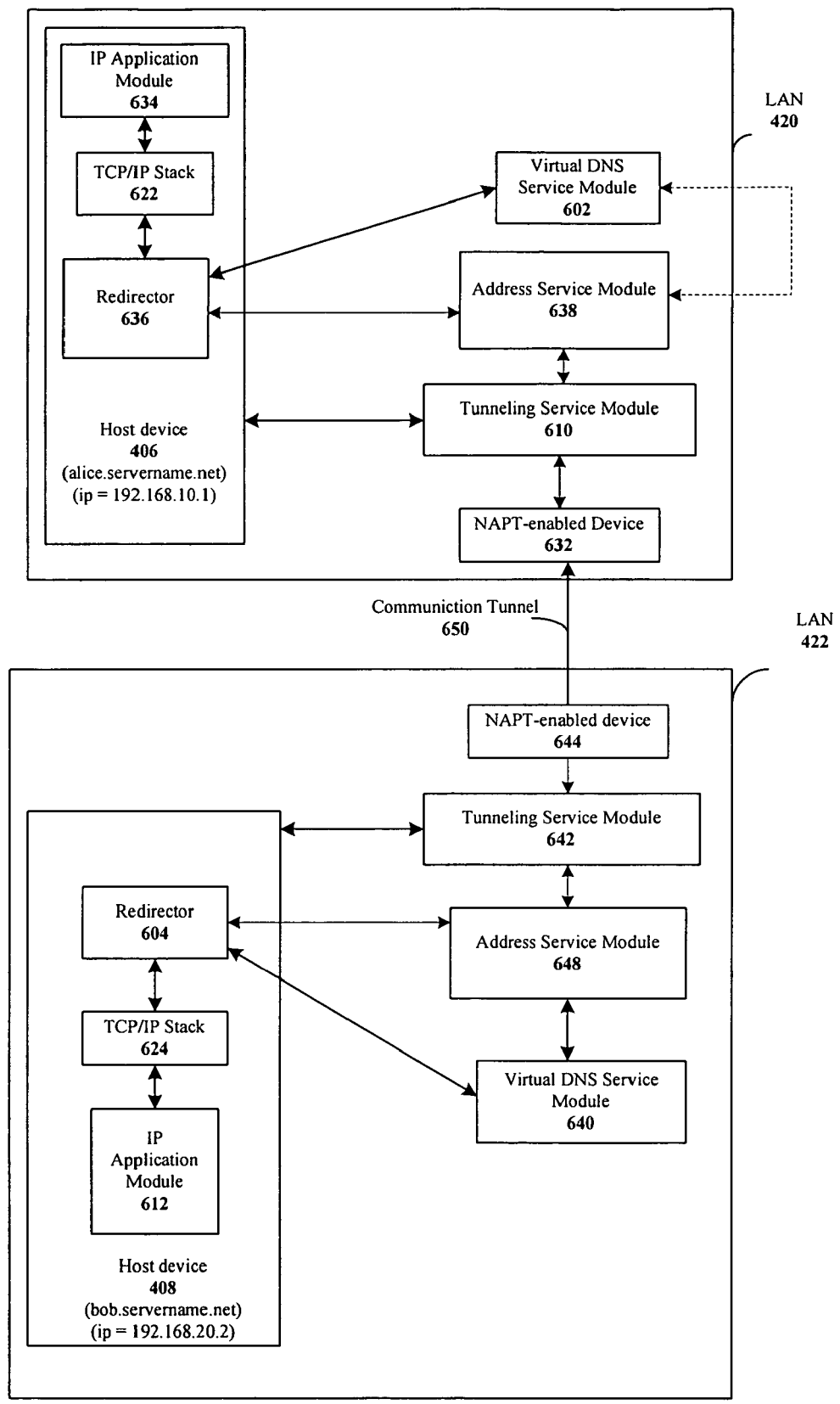
FIG. 6 illustrates another embodiment of a communications system according to one embodiment of the invention.

FIG. 6 further illustrates another embodiment and describes the communication process between host devices in different LANs. Host device 406, which is located in network 420 with a private IP address 192.168.10.1, includes IP application module 634 running IP based applications, a TCP/IP stack 622 and redirector 636. Similar to what is described in FIG. 5, network 420 includes Address Service Module 638, Tunneling Service Module 620, a Virtual DNS Service Module 602 and NAPT-enabled device 632.

On the side of network 422, it also includes NAPT-enabled device 644, Tunneling Service Module 642, Address Service Module 648, Virtual DNS Service Module 640. Host device 408 with a private IP address 192.168.20.2, includes a Redirector 604, TCP/IP stack 624 and an IP Application Module 612.

Figure 7A:
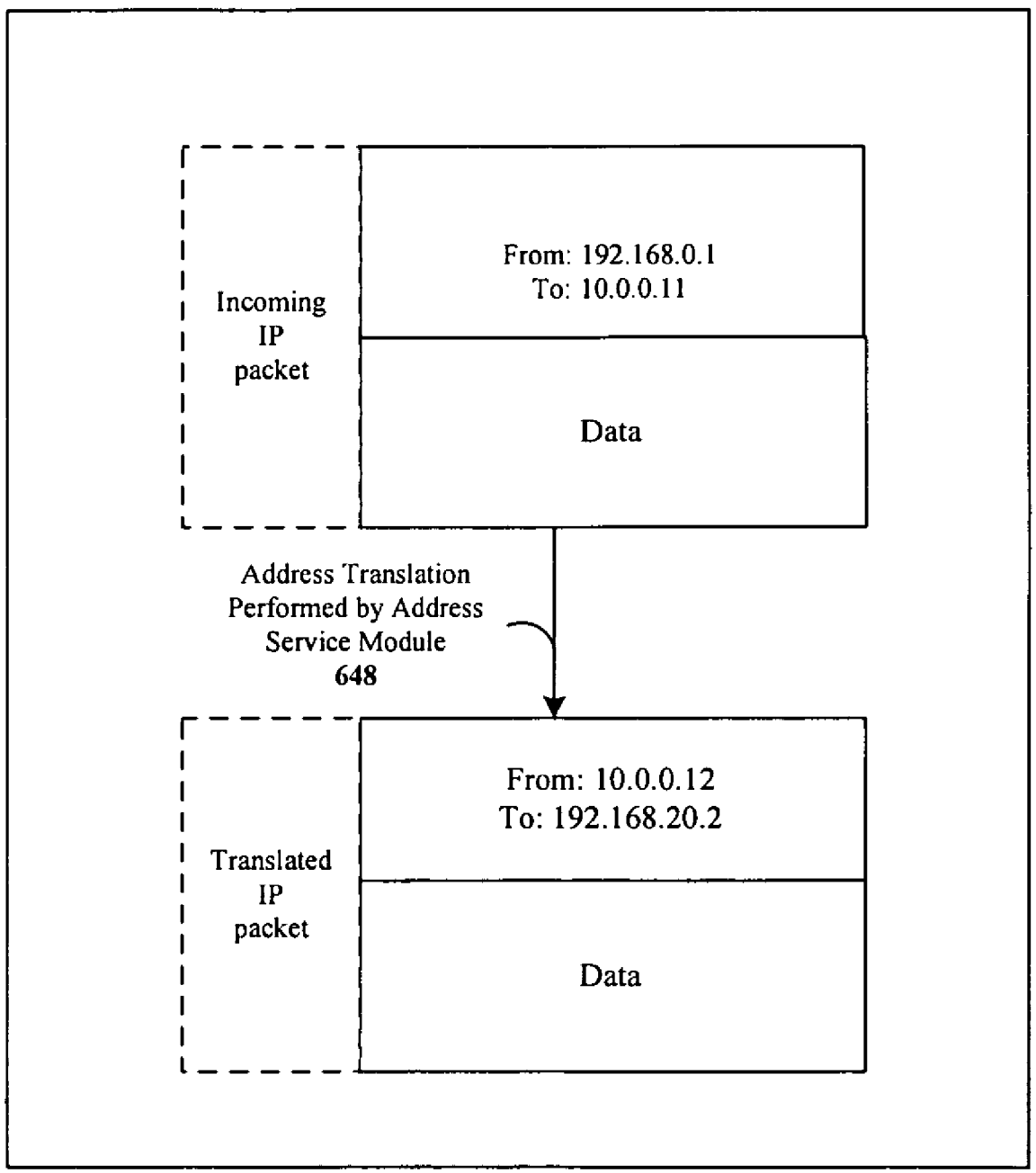
FIG. 7A illustrates an embodiment of the address translation service according to one embodiment of the invention.

In network 420, Virtual DNS Service Module 602 includes a table storing private IP addresses that are assigned by network 420 to host devices in other network and associating these private IP addresses with the alphabetic domain names assigned by server 401 (not depicted in FIG. 7A). For example, for host device 408 in network 422, network 420 designates 10.0.0.11 to the domain name bob.servername.net. Correspondingly, in the table maintained by Virtual DNS Service Module 602, an entry is entered to associate 10.0.0.11 to associate with bob.servername.net. Similarly, assuming another host device located in other networks being assigned with a domain name eve.servername.net by server 401 and being assigned an IP address 10.0.0.12 in network 420, Virtual DNS Service Module 602 includes an entry to associate eve.servername.net and 10.0.0.12.

In network 422, Virtual DNS Service Module 640 performs similar functions as those of Virtual DNS Service Module 602. For host device 406 in network 422 with the domain name alice.servername.net, Virtual DNS Service Module 640 maintains an entry to associate alice.servername.net with 10.0.0.12 which is the private IP address assigned by network 422 to host device 406. Similarly, as for host device with eve.servername.net by server 401, Virtual DNS Service Module 602 includes an entry to associate eve.servername.net with 10.0.0.11 which is the private IP address assigned by network 422. Notably, for the same host device with a globally-unique domain name eve.servername.net, different local networks associate it with different private IP addresses. For any devices in the different networks to communicate with this eve.servername.net, the associated private IP addresses within their own network are used to designate the destination and facilitate the communication. It is noted that the associated private IP address for eve.servername.net could be different for different network due to the dynamic nature of the address assignment.

The description below provides more details about the data flow from host device 406 to host device 408 in the embodiment as described in FIG. 6. It is understood that the same techniques and data flow are used in the communications between any devices behind NAPT-enabled devices through the assigned private IP addresses.

In host device 406, IP Application Module 634 runs application programs which use Internet Protocol standard to communicate with other host devices. Such application programs include browser programs such as Microsoft Internet Explorer and instant messengers such as ICQ, Yahoo Messenger etc. Such programs also include peer-to-peer applications to share data and files or online interactive game applications. When such application is launched to send IP packet from alice.servername.net to bob.servername.net, a DNS request and later IP packets passes through TCP/IP Stack 622. Redirector 636 is a program that intercepts such DNS request and subsequent IP packets. When redirector 636 intercepts the DNS request, if the redirector knows the DNS request is to the special domain servername.net, redirector 636 inquires Virtual DNS Service Module 602 to provide the private IP address that is dynamically assigned to bob.servername.net. In this case, redirector 636 obtains the private IP address of bob.servername.net 10.0.0.11. Subsequent IP packets that are destined to 10.0.0.11 will be also intercepted by redirector 636. Address Service Module 638 determines the location of the destination address 10.0.0.11 or determines where it should pass the IP packets for further determination of the destination address 10.0.0.11. In one embodiment, Address Service Module 638 processes the request and IP packet and then passes them to Tunneling Service Module 610 for penetrating NAT devices.

Tunneling Service Module 610 performs techniques to penetrate NAPT-enabled device 632 depending on the specific types of the IP applications and the types of NAPT-enabled device 632. In particular, Tunneling Service Module 610 establishes a communication tunnel 650 between alice.servername.net and bob.servername.net. Since there are multiple methods to do the tunneling service, Tunneling Service Module 610 intelligently determines an optimal tunneling method and preferred penetration method. For example, tunneling method could include tunneling with UDP, tunneling with TCP, tunneling with instant message or other form of messaging system, etc. For UDP or TCP tunneling, depending on the NAPT situations at both ends of the communicating networks, a preferred NAPT penetration method is selected. Tunneling Service Module 610 also appends encapsulation header and applies optional compression, encryption or other processing to the IP packet depending on the configuration of network 420 or the requirements of the IP applications.

After the IP packet is passed through NAPT-enabled device 632, it is properly routed through the communication tunnel 650 to the server where network 422 is located. In network 422, Tunneling Service Module 642 enables the IP packet received from communication tunnel 650 to transmit through NAPT-enabled device 644. Tunneling Service Module 642 strips encapsulation header from the IP packet. It also decompresses and decrypts the IP packet.

Address Service Module 648 translates the incoming IP packet from Tunneling Service Module 642. FIG. 7A illustrates the result of the address translation performed by Address Service Module 648.

As described above, the incoming IP packet bears the original sender address 192.168.0.1 (alice.servername.net) and the destination address 10.0.0.11. According to one of the embodiment of the present application, Address Service Module 648 selects to ignore the source and destination addresses of 192.168.0.1 and 10.0.0.11. Instead, Address Service Module 648 modifies the source and destination addresses based on the fact that the incoming IP packet is received from the communication tunnel 650 established between alice.servername.net and bob.servername.net. The source and destination addresses are modified into the addresses according to the network configuration at network 422. After the translation, the translated IP packet now bears the original source address as 10.0.0.12 and the destination address as 192.168.20.2. As described above, 10.0.0.12 is the private IP address assigned by network 422 to host device 406 (alice.servername.net) and 192.168.20.2 is the private IP address of host device 408. These private IP addresses are stored in Virtual DNS Service Module 640. Address Service Module 648 retrieves the relevant address information from Virtual DNS Service Module 640.

Subsequent to the address translation done by Address Service Module 648, the IP packet received from alice.servername.net is passed to host device 408 by network 422 according to the network configuration.

Likewise, in responding to the request received from host device 406 or in a separate session to communicate with host device 406, host device 408 sends IP packet and requests through the communication tunnel established by Tunneling Service Module 642 and Tunneling Service Module 610. When IP Application Module 612 requests to contact alice.servername.net and sends IP packets to alice.servername.net, this request passes through TCP/IP Stack 624 and Redirector 604 redirects this request to Address Service Module 642. As described above, if it is the first time Redirector 604 processes a request related to alice.servername.net, it retrieves the private IP address assigned to alice.servername.net from Virtual DNS Service Module 640. In this case, the private IP address associated with alice.servername.net is 10.0.0.12. As a result, the IP packet is identified as 192.168.20.2 to 10.0.0.12. When Address Service Module 648 receives such IP packet, it does not need to modify the addresses of the original sender and the destination. The IP packets directed to alice.servername.net are further transmitted by Tunneling Service Module 642 through NAPT-enabled device 644.

Again, Tunneling Service Module 642 maintains or establishes the communication tunnel 650 with Tunneling Service Module 610 by implementing a variety of tunneling techniques to penetrate the NAPT-enabled Devices 644 and 632.

Figure 7B:
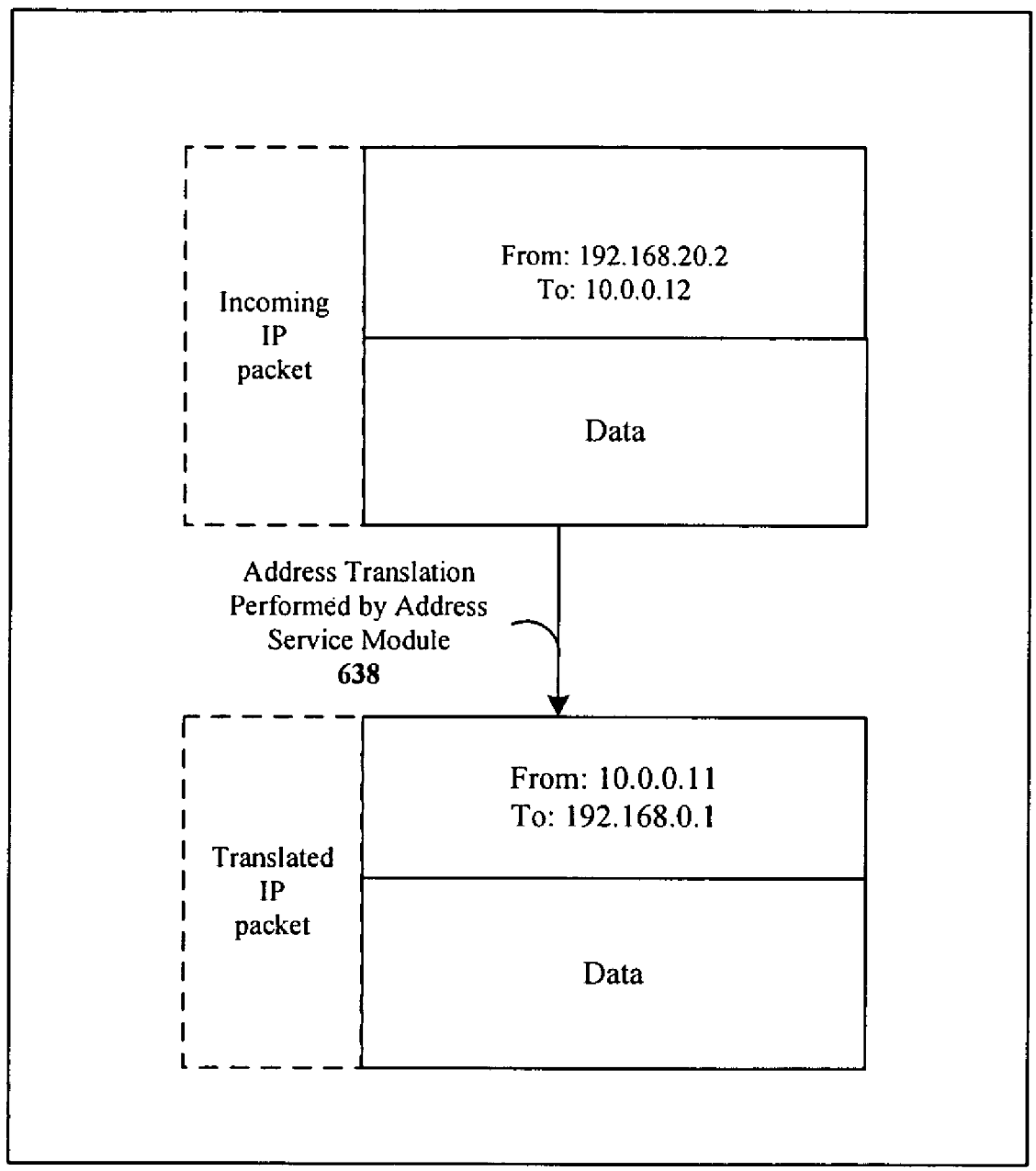
FIG. 7B illustrates another embodiment of the address translation service according to one embodiment of the invention.

When the IP packets successfully arrive in network 420 at Tunneling Service Module 610, Address Service Module 638 modifies or translates the source address and the destination address in the IP packet. Similar to the purpose of FIG. 7A, FIG. 7B describes the result of address translation at Address Service Module 638. The incoming IP packet received from the communication tunnel between bob.servername.net and alice.servername.net includes the original address information assigned by network 422. Address Service Module 638 disregards this address information and modifies the source and the destination addresses based on the private IP addresses assigned by network 420. Consequently, the translated IP packet is indicated with new address information, i.e., the source address 10.0.0.11 and the destination address 192.168.0.1. The designation of the address information enables network 420 to pass the IP packet to host device 406.

Figure 7C:
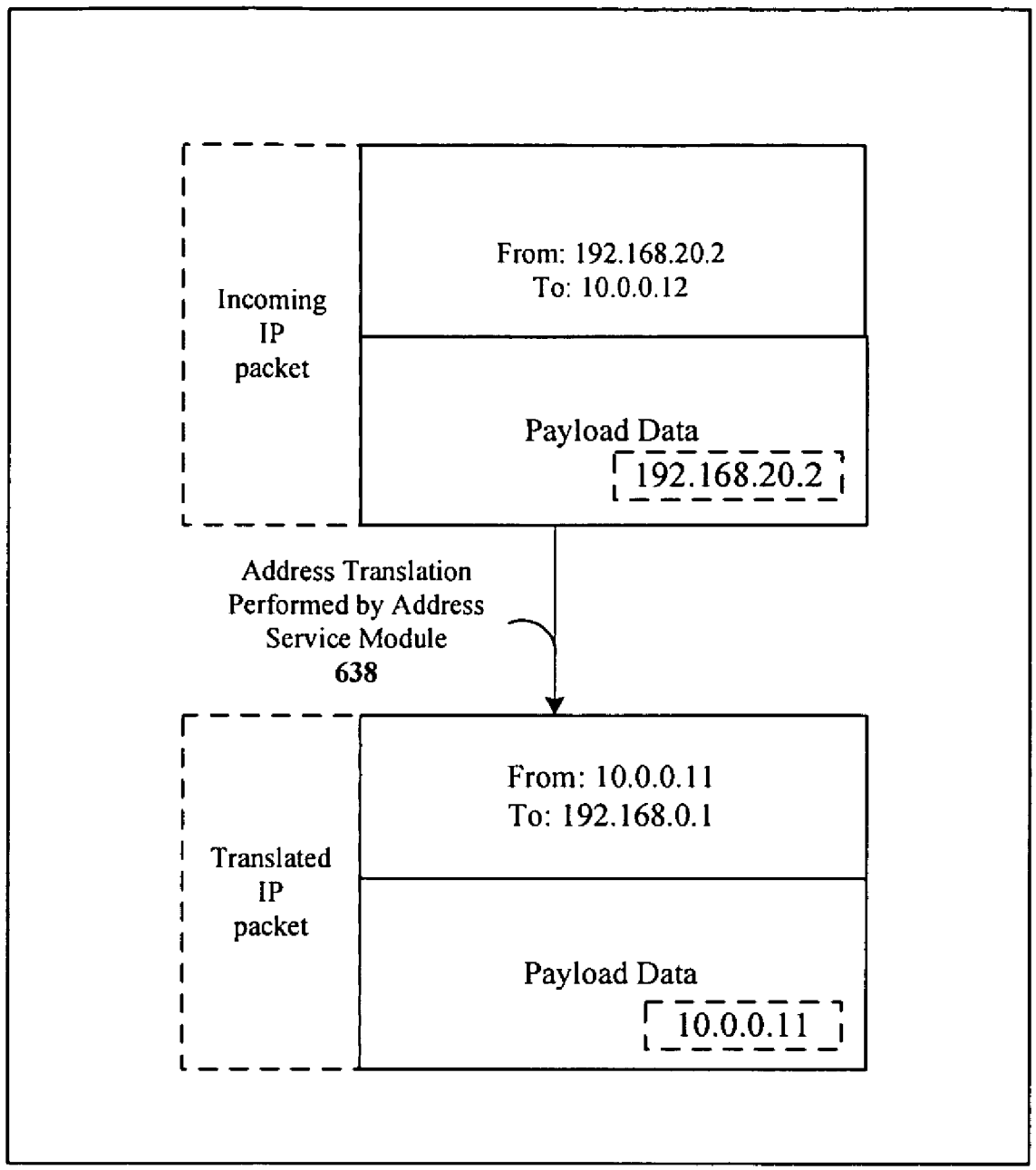
FIG. 7C illustrates an embodiment of performing address translation for the payload data according to one embodiment of the invention.

FIG. 7C shows an embodiment of performing the address translation when the address information is located in payload of IP packet. It is understood that for some FTP or peer-to-peer applications, the source and destinations addresses and DNS names are located in the payload data. In one of embodiments of the present invention, Address Service Module 638 or 648 applies logic for distinguishing specific types of IP applications and directly modifies IP addresses or DNS names carried by the payload data.

It is noted that FIG. 6 depicts an embodiment wherein redirector 604 is located in host device. According to another embodiment of the present invention, such a redirector can be separate from host device while an agent of the redirector is configured in the kernel of the operation system and redirects all requests from IP applications to the redirector for further handling. This may substantially reduce the complexity of implementation.

In the embodiment of FIG. 6, various function modules such as address service module, tunneling service module and virtual DNS service module are depicted as being separate from host devices and NAPT-enabled devices. In alternative embodiments, tunneling service module and virtual DNS service module are integrated into the host devices for simplicity of implementation or for satisfying customers' needs. Other alternative embodiments according to this invention place these function modules in NAPT-enabled devices in entirety or in part depending on the needs of hardware implementation. For example, a network gateway or router integrates the tunneling service modules, address service modules and virtual DNS service modules.

Figure 8:
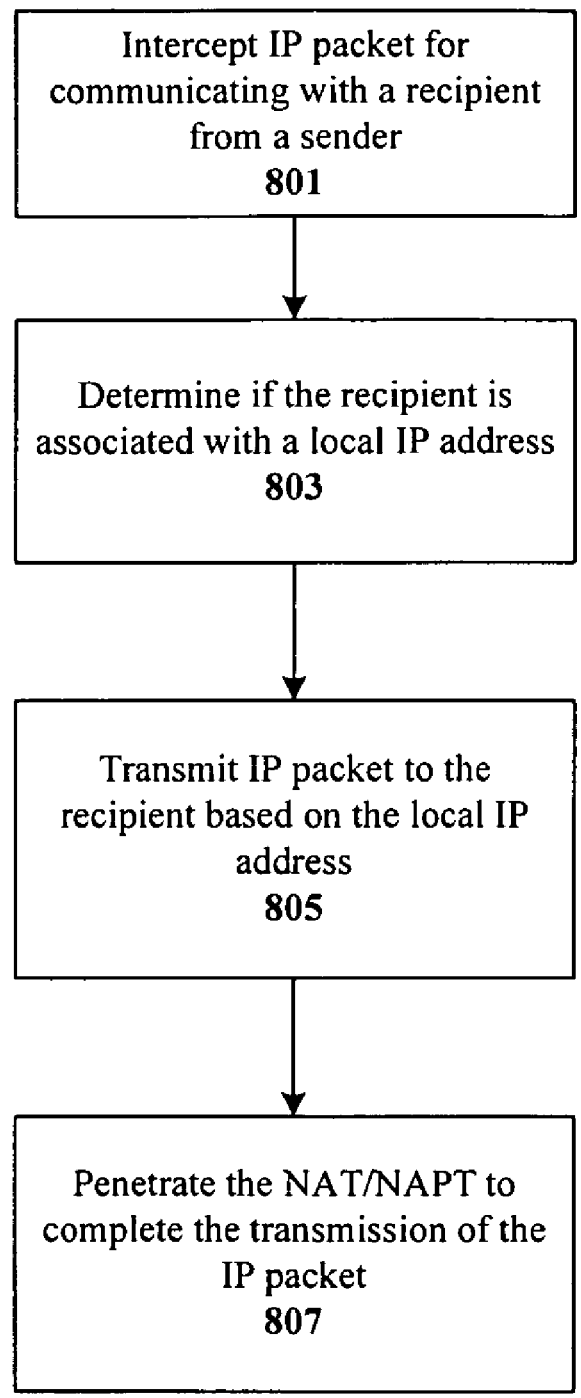
FIG. 8 is a flow chart illustrating the steps to be performed by a sender in the communications system according to one embodiment of the invention.

FIG. 8 illustrates the steps performed by a sender in order to communicate with a recipient according to an embodiment of this invention. The steps capture what have been described in the preceding paragraphs. It should be understood that the steps can be implemented in a system which are identical or similar to the embodiments described herein.

When a device or a node (sender) launches an IP application to communicate with another device or node (recipient), e.g., an online game application to allow two users to interact, such IP packets are intercepted 801. It is further 803 determined if the recipient device or node is associated with a private IP address. The private IP address is dynamically assigned by address service modules or even virtual DNS service modules when the DNS query is done before the IP data communication proceeds. Such a private IP address has no relation to the private IP address of the recipient that was assigned by the network it belongs to.

The private IP address assigned to the recipient are used 805 to transmit IP packet. It should be pointed out that the recipient and the sender are associated with globally-unique domain names while it is possible that neither the sender nor the recipient themselves have public IP addresses. In order to complete the transmission of IP packet, NAT/NAPT devices at the sender and the recipient sides are 807 penetrated. In one embodiment, a tunnel is established to penetrate such existing NAT or NAPT. Using a variety of the NAT penetration techniques, the sender automatically transverse the NAPT-enabled devices and transmit the IP packet across the networks.

Figure 9:
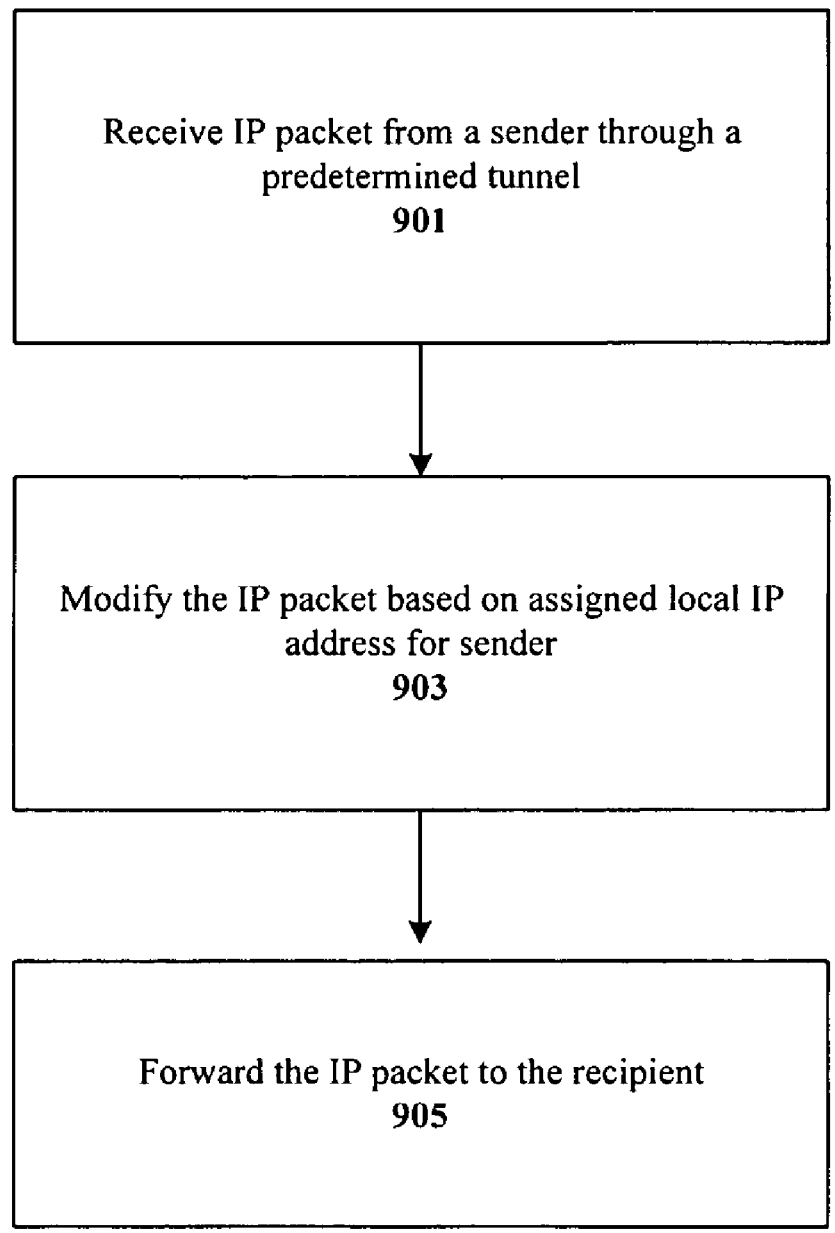
FIG. 9 is a flow chart illustrating the steps to be performed by a recipient in the communication systems according to one embodiment of the invention.

FIG. 9 further describes the steps performed by the receiving side according to one of the embodiments of the present invention. After the IP packet is 901 received from the sender, the NAP/NAPT device at the recipient side is penetrated through the predetermined tunnel. The received IP packet is modified 903 based on the private IP addresses that are assigned for the sender and the recipient by the receiving network. As described above, the sender is assigned a private IP address by the network where the recipient belongs to or the recipient itself. The recipient receives the IP packet as if the IP packet receives from a location designated by the private IP address assigned to the sender. The IP packet is subsequently forwarded 905 to the recipient.

Likewise, the recipient responds to the IP packet by returning IP packet to the sender. The steps as described in FIG. 8 are performed on the recipient side and the IP packet eventually will arrive at the sender side by performing the steps described in FIG. 9.

In doing so, peer-to-peer applications are operable through the assigned private IP addresses for devices or hosts in different LANs or WANs. The assigned private IP addresses significantly alleviate the shortage of public IP addresses. Each individual host or nodes identify other hosts or nodes through private IP addresses, significantly expanding the capability of potential peer-to-peer applications or multimedia services.

While various embodiments of the present invention have been described above, it should be understood that they have been presented by way of examples, and not limitation. It will be apparent to persons skilled in the relevant art that various changes in form and detail may be made therein without departing from the spirit and the scope of the invention.

We claim:

1. A system for communicating between a first private network and a second private network, the system comprising:
    a first device in the first private network, having a first interface at which a first end of a tunnel is terminated, the first device being coupled to a first NAPT (Network Address Port Translation)-enabled device, and comprising a first address module and a first tunneling module that corresponds to a first local address within the second private network;
    a second device in the second private network, having a second interface at which a second end of the tunnel is terminated, the second device being coupled to a second NAPT-enabled device and comprising a second address module and a second tunneling module that corresponds to a second local address within the first private network;
    a server device, coupled to the first device and the second device, that provides information related to a location of the first device in the first private network and the second device in the second private network and facilitates NAPT penetration and the tunnel; and
    wherein the first address module enables the first tunneling module to communicate with the second device by penetrating the second NAPT-enabled device based on the second local address and the information received from the server device.

2. The system of claim 1, wherein the first device is coupled to a first redirector that forwards data received from the first device to the first address module for communicating with the second device.

3. The system of claim 2, wherein the first redirector intercepts data sent from the first device based on Internet Protocol standard.

4. The system of claim 2, wherein the first redirector is coupled to a virtual DNS service module to retrieve the first local address, the virtual DNS server module associating the first local address with the second device.

5. The system of claim 1, wherein the first address module determines whether the second device corresponds to the first local address of the first network.

6. The system of claim 1, wherein the first address module assigns the first local address of the first private network to the second device.

7. The system of claim 1, wherein the first local address is a private IP subnet address used by a local area network (LAN).

8. The system of claim 1, wherein the first local address is a public IP address acquired by the first network for the second device.

9. The system of claim 1, wherein the first NAPT-enabled device and the second NAPT-enabled device include routing devices and firewall.

10. The system of claim 1, wherein the first tunneling module selectively penetrates the first NAPT-enabled device when the first device communicates with the second device.

11. The system of claim 1, wherein the second tunneling module selectively enables penetration of the second NAPT-enabled device when the second device communicates with the first device.

12. The system of claim 1, wherein the first tunneling module and the second tunneling module establish a communication channel to penetrate the first NAPT-enabled device and the second NAPT-enabled device.

13. The system of claim 1, wherein the second address module modifies data received from the first device based on the first local address and the second local address.

14. The system of claim 13, wherein the data received from the first device includes the information related to the addresses of the first device and the second device in the first network.

15. The system of claim 1, wherein the server device assigns a first unique domain name to the first device and a second unique domain name to the second device.

16. The system of claim 1, wherein the server device enables the first tunneling module and the second tunneling module to communicate the first device with the second device.

17. The system of claim 1, wherein the server device authenticates the identity of the first device and the second device.

18. A private computing network, comprising:
a first host device having a first private interface, coupled to a NAPT (Network Address Port Translation)-enabled device, that communicates with a second private interface on a second host device which is located outside of a private computer network containing the first host device,
wherein the first host device comprises;
an IP application module;
an address module for assigning a first local IP address of the private computer network to the second host device;
a redirector, coupled to the IP application module and the address module, for redirecting data received from the IP application module to the address module; and
a tunneling module, coupled to the address module and a server device for establishing tunneling service, the tunneling module establishes a communication channel by penetrating the NAPT-enabled device.

19. The computing network of claim 18, further comprising a virtual DNS service module, coupled to the first host device, for storing the first local IP address of the second host device.

20. The computing network of claim 18, wherein the first host device is coupled to a device for assigning a domain name to the first host device.

21. The computing network of claim 18, wherein the first host device and the second host device are coupled to a device for authenticating the identity of the first host device and the second host device.

22. The computing network of claim 18, wherein the address module receives data from the second host device and modify the received data based on the first local IP address of the second host device.

23. The computing network of claim 18, wherein the NAPT-enabled device includes a routing device.

24. The computing network of claim 18, wherein the NAPT-enabled device includes a firewall.

25. The computing network of claim 18, wherein the first host device is operative of peer-to-peer applications based on Internet Protocol.

26. The computing network of claim 18, wherein the first host device is a computer.

27. The computing network of claim 18, wherein the first host device is a mobile communication device.

28. A method for tunneling between a first private interface on a sender host and a second private interface on a recipient host, the sender and recipient hosts residing in different private networks, the method comprising:
intercepting data between the sender host and the recipient host;
associating the data with the recipient host based at least partially on a first IP address stored within the sender host, the first IP address being a local private IP address of the recipient host; and
transmitting the data through the tunnel between the sender host and the recipient host, the tunnel penetrating at least one NAPT (Network Address Port Translation)-enabled device coupled between the sender and recipient hosts.

29. The method of claim 28, further comprising the steps of:
creating a signature of the sender host; and
authenticating the identity of the sender by host by the recipient host based on the signature.

30. A method to securely communicate between a sender host and a recipient host, the sender host and the recipient host being coupled to at least one NAPT (Network Address Port Translation)-enabled device, the method comprising:
establishing a communication channel between the sender host and the recipient host, the sender host and the recipient host being located in different private computing networks;
establishing a tunnel through the at least one NAPT-enabled device by penetrating a first NAPT-enabled device within the at least one NAPT-enable device, the tunnel terminating at a first private interface on the sender host and a second private interface on the recipient host;
receiving data from the sender host;
modifying at least a portion of the data based on a first local address assigned to the sender host by a computing network where the recipient is located; and
forwarding the modified data to the recipient host.

31. A computing device operative within a private computing network, coupled to a NAPT (Network Address Port Translation)-enabled device and a tunneling service device, comprising:
an application module for operating an IP-based application to communicate with a receiving device which is operative outside the private computing network;
a redirection module coupled to the application module, for intercepting a data packet sent from the application module to the receiving device, and for redirecting the data packet to a communication channel to penetrate the NAPT-enabled device based on a local IP address assigned by the private computing network for the receiving device; and
wherein the tunneling service device participates in establishing the communication channel by facilitating the computing device to penetrate a NAPT-enabled device.

32. A computing device of claim 31, wherein the redirection module is coupled to a tunneling module, the tunneling module coupled to the tunneling service device for establishing tunneling service and selectively penetrating the NAPT-enabled device.

* * * * *